United States Patent Office.

EDWARD BRADY, OF PHILADELPHIA, PENNSYLVANIA.

Letters Patent No. 95,419, dated October 5, 1869.

IMPROVEMENT IN PURIFYING IRON AND STEEL, OR OTHER METAL.

The Schedule referred to in these Letters Patent and making part of the same

*To whom it may concern:*

Be it known that I, EDWARD BRADY, of the city of Philadelphia, in the State of Pennsylvania, have invented an Improved Mode of Purifying Iron or any other Metal; and I declare the following to be a sufficiently full and exact description thereof to enable one skilled in the art to which it appertains, to carry it into effect.

The nature of this invention is a further improvement in the manufacture of iron, &c., for which I obtained Letters Patent on the 10th of August, 1869; and, in its present preferred form, consists in mingling, mixing, and manipulating sulphates of soda, potassa, and alumina, or any sulphates of the metals of the alkalies, earths, or alkaline earths and calcium, or the oxides or other compounds thereof, with any sort, kind, or description of melted iron, ores of iron, or iron pyrites, &c., or of any other melted metal or mineral, in an ordinary blast-furnace, by common mechanical means, or the melted iron, &c., can be poured on to the sulphates in suitable vessels, but the calcium should be added last, the chemical changes and results, consequent thereupon, decomposing, evolving, separating, combining, and depositing, by the laws of natural chemical affinity, the impurities of carbon, phosphorus, silicon, sulphur, &c., and generating sulphurous, &c., acid gases, and forming a slag.

The oxygen becoming disengaged, upon a decomposition of the sulphates, caused by a contact with the melted iron, &c., or consequent upon a fusion therewith, will unite, by chemical attraction, with a greater part, or more or less, of the carbon, phosphorus, silicon, and a portion of the sulphur, in the molten mass, and will form carbonic-acid gas, phosphorous-acid gas, silicic acid, in a liquidity, and sulphurous-acid gas, these gases escaping or passing off, or they may be conducted into proper receptacles, by some convenient methods; and the fluid acid, and the remaining sulphur, having a much greater natural chemical affinity for the calcium, and for the other bases, sodium, potassium, or aluminium, &c., than for iron, &c., will coalesce, and make sulphides and silicates, or a slag, which becomes disengaged from the iron, &c., by specific gravity, leaving the hot iron, &c., pure; and the same can be converted, by the usual manner of proceeding therein, into wrought or malleable iron, &c., or, when a sufficiency of the carbon is left in it, into steel, and direct from the melting-furnaces, without the intervention of, and dispensing with, the processes known as "puddling," &c.

The quantities or proportions of materials and chemical agents, or ingredients to be used, cannot be specified definitely, because such depends upon the greater or less amount or share of the impurities contained in the molten metal, which varies materially, according to its quality, thus requiring a larger or smaller quantity of the sulphates, and proportion of calcium, to be determined by a practical experience in every instance.

One pound each of the dry sulphates of soda and potassa, or their equivalents, and three pounds of calcium, in the form of pulverized lime, or other available form, will produce a purifying change, or beneficial effect, upon one thousand pounds of molten metal; but I do not desire to limit myself to those or to any specific quantities of the chemical agents; as with iron, or other metal or mineral containing much sulphur, an increased proportion of calcium may be advantageous.

I wish it distinctly understood that I do not limit myself to iron only, as the above chemical process is applicable to any other metal or mineral.

What I claim as my invention, and desire to secure by Letters Patent, is—

Mixing the sulphates of the alkalies or alkaline earths, &c., and calcium, in the form of lime, or other available form, with melted iron, or any other metal or mineral, whereby the impurities of sulphur, silicon, phosphorus, &c., are set free, substantially as above described and set forth.

EDWARD BRADY.

Witnesses:
 HUGH BRADY,
 W. F. BRADY,
 E. BRADY, Jr.